W. MAIN.
Milling Attachment for Lathes.
No. 217,470. Patented July 15, 1879.
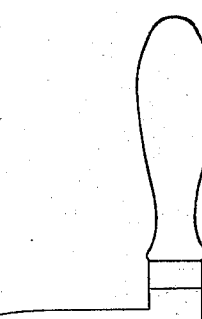
FIG. 1.
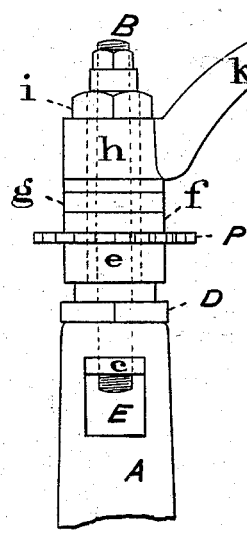
FIG. 2.
FIG. 3.
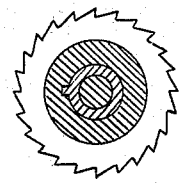
WITNESSES.
INVENTOR:
Wm Main.

UNITED STATES PATENT OFFICE.

WILLIAM MAIN, OF PIERMONT, NEW YORK.

IMPROVEMENT IN MILLING ATTACHMENTS FOR LATHES.

Specification forming part of Letters Patent No. 217,470, dated July 15, 1879; application filed March 20, 1879.

*To all whom it may concern:*

Be it known that I, WILLIAM MAIN, of Piermont, Rockland county, in the State of New York, have invented a new and useful Improvement in Milling Attachments for Lathes, of which the following is a description in such full, clear, concise, and exact terms as will enable any one skilled in the art or science to which it appertains or with which it is most nearly connected to make and use the same, reference being had to the accompanying drawings, making part of the specification, and the letters of reference marked thereon.

My invention consists of a milling attachment to be applied to the tool-rest for the purpose of cutting or grooving taps, reamers, or gearing, or indeed any tool or part of a tool that requires to be channeled, grooved, or corrugated.

The parts and combination of parts comprising the attachment and their combination with the tool-rest of the lathe are fully illustrated in the drawings, in which—

Figure 1 is an elevation. Fig. 2 is a vertical section, and Fig. 3 a horizontal section.

The tool head or rest of a lathe is so common a device that no special or detail description or drawing of it is necessary. Only an outline of the tool-head is, therefore, shown in the drawings. It is represented by A, and may be made of any form or style known to the trade of tool makers or workers.

To the tool-head I apply my attachment. It consists of a stationary arbor or central pedestal, B, secured to the tool-head by a square or oblong nut, C, fitted to the opening E, and by means of a nut, D, made fast to the arbor, by which the latter is firmly screwed into the nut C. Upon the arbor B a sleeve, I, provided with a collar, O, is fitted to snugly and easily rotate about the arbor. The sleeve I is fitted with a feather, J, set in its periphery on a line with its axis, and upon this feather and sleeve are fitted a series of washers or metal blocks, $e, f, g$, and $a$, and also a creasing, milling, or cutting tool, P, the whole being firmly secured by reason of a secured nut, $i$, applied to the end of the sleeve. To the top end of the arbor a screw-nut, $v$, is applied upon a collar, $d$, fitted with a feather-pin, $t$, by which the nut D is drawn up against the collar $o$ on the sleeve. There is also fitted upon the sleeve I and feather J a crank, K, the hub of which is shown by $h$.

The vertical position of the milling-tool P on the arbor is regulated by the washers $e, f, g$, and $a$, and according as more or less of them are placed above or below it will its position be higher or lower to the extent depending upon their thickness.

The operation is as follows: The tap, reamer, cog-wheel, or other tool or part of tool to be milled, grooved, or creased is set in the center of the lathe. The attachment is applied to the tool-head. The milling-tool P is adjusted to its proper position. The crank or driving power is then put in motion, and as the lathe-rest moves along the tool P cuts the crease or groove in the tool or thing in process of formation.

I claim as my invention—

A milling attachment combined with the tool head or rest of a lathe, consisting of a stationary arbor combined with a rotating sleeve fitted with a cutting or milling tool susceptible of adjustment, as described.

WM. MAIN.

Witnesses:
 AMOS BROADNAX,
 WM. H. BROADNAX.